(12) United States Patent
Bozell et al.

(10) Patent No.: US 10,145,063 B2
(45) Date of Patent: Dec. 4, 2018

(54) COMPREHENSIVE PROCESS FOR SELECTIVELY SEPARATING LIGNOCELLULOSIC BIOMASS INTO PURIFIED COMPONENTS WITH HIGH YIELD

(71) Applicant: University of Tennessee Research Foundation, Knoxville, TN (US)

(72) Inventors: Joseph Bozell, Knoxville, TN (US); David Harper, Maryville, TN (US); Nicole Labbe, Knoxville, TN (US); Omid Hosseinaei, Knoxville, TN (US); Timothy Rials, Maryville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 151 days.

(21) Appl. No.: 15/505,465

(22) PCT Filed: Aug. 28, 2015

(86) PCT No.: PCT/US2015/047423
§ 371 (c)(1),
(2) Date: Feb. 21, 2017

(87) PCT Pub. No.: WO2016/033456
PCT Pub. Date: Mar. 3, 2016

(65) Prior Publication Data
US 2017/0247834 A1    Aug. 31, 2017

Related U.S. Application Data (60) Provisional application No. 62/043,602, filed on Aug. 29, 2014.

(51) Int. Cl.
*D21C 11/00* (2006.01)
*D21C 3/20* (2006.01)
(Continued)

(52) U.S. Cl.
CPC ...... *D21C 11/0007* (2013.01); *C08B 37/0057* (2013.01); *C08H 8/00* (2013.01);
(Continued)

(58) Field of Classification Search
None
See application file for complete search history.

(56) References Cited

U.S. PATENT DOCUMENTS

| 2,380,448 | A | 7/1945 | Katsen |
| 5,730,837 | A | 3/1998 | Black et al. |

(Continued)

FOREIGN PATENT DOCUMENTS

| DE | 2803465 A1 | 8/1979 |
| EP | 2336194 A1 | 6/2011 |
| WO | 2013166469 A2 | 11/2013 |

OTHER PUBLICATIONS

Chum et al, Pretreatment-catalyst effects and the combined severity parameter, Applied biochemistry and biotechnology, vol. 24/25 pp. 1-13 (Year: 1990).*

(Continued)

*Primary Examiner* — Melvin C. Mayes
*Assistant Examiner* — Stefanie J Cohen
(74) *Attorney, Agent, or Firm* — Luedeka Neely Group, P.C.

(57) ABSTRACT

A comprehensive process for treating lignocellulosic biomass in order to separate the biomass into its component parts, the process comprising: a) contacting the lignocellulosic biomass with a first solvent for a period of time and at a first temperature at a severity in the range of about 2 to about 4 to remove extractive components and a portion of ash from the biomass; b) contacting the biomass from step (a) with a second solvent, and optional catalyst, at a second temperature at a severity in the range of about 1 to 5 to (Continued)

remove hemicelluloses and additional ash from the biomass; and c) separating the biomass from step (b) into a lignin product and a cellulose product by contacting the biomass from step (b) with a third solvent at a severity in the range of about 1.5 to 5 to provide a spent liquor product and a solid fraction containing cellulose.

39 Claims, 3 Drawing Sheets

(51) Int. Cl.
*D01C 1/02* (2006.01)
*D01D 5/00* (2006.01)
*D01F 9/17* (2006.01)
*C08B 37/00* (2006.01)
*C08H 8/00* (2010.01)

(52) U.S. Cl.
CPC ............ *D01C 1/02* (2013.01); *D01D 5/0038* (2013.01); *D01F 9/17* (2013.01); *D21C 3/20* (2013.01)

(56) References Cited

U.S. PATENT DOCUMENTS

| | | |
|---|---|---|
| 2008/0032344 A1 | 2/2008 | Fallavollita |
| 2009/0062516 A1 | 3/2009 | Belanger |
| 2012/0116063 A1 | 5/2012 | Jansen et al. |
| 2012/0118517 A1 | 5/2012 | Lehoux et al. |
| 2012/0226029 A1 | 9/2012 | Dodd |
| 2013/0029406 A1 | 1/2013 | Dottori et al. |
| 2014/0170713 A1 | 6/2014 | Retsina et al. |
| 2014/0242867 A1 | 8/2014 | Jensen et al. |
| 2016/0024712 A1 | 1/2016 | Smit et al. |

OTHER PUBLICATIONS

Kadam et al, Continuous biomass fractionation process for producing ethanol and low-molecular weight lignin, Environmental process and sustainable energy, vol. 28 No. 1 (Year: 2009).*
Bozell, J.J.; O'Lenick, C. J.; Warwick, S, "Biomass Fractionation for the Biorefinery: Heteronuclear Multiple Quantum Coherence—Nuclear Magnetic Resonance Investigation of Lignin Isolated From Solvent Fractionation of Switchgrass," Journal of Agric. Food Chem, 2011, vol. 59, pp. 9232-9242.

* cited by examiner

COMPREHENSIVE PROCESS FOR SELECTIVELY SEPARATING LIGNOCELLULOSIC BIOMASS INTO PURIFIED COMPONENTS WITH HIGH YIELD

RELATED APPLICATION

This application claims priority to provisional application Ser. No. 62/043,602, filed Aug. 29, 2014.

GOVERNMENT RIGHTS

This invention was made with government support under grant number 2010-38502-21854 awarded by USDA-NIFA, grant number 2013-67021-21158 awarded by USDA-AFRI, and grant number DTOS59-07-G-00050 awarded by DOT. The government has certain rights in the invention.

TECHNICAL FIELD

The disclosure is directed to comprehensive process for the separation of lignocellulosic biomass into its component parts and recovery and purification of the component parts of the biomass.

BACKGROUND AND SUMMARY

Lignocellulosic biomass includes herbaceous crops, hardwoods, and softwoods such as switchgrass, hybrid poplar, and pine respectively. Such biomass materials are used as precursors for chemicals, polymers, fibers, fuels, and the like. Lignin may be isolated from the biomass and used to produce a multitude of products and intermediates. Products may include, but are not limited to, resins, foams, fuels, dyes, dispersants, films, packaging materials, electrochemical devices, and structural and non-structural fibers.

Hemicelluloses are another component of lignocellulosic biomass. Hemicelluloses are important to the paper industry. In chemical wood pulps, hemicellulose is needed for satisfactory pulp quality. Hemicelluloses aid the swelling of the pulp, the bonding of the fibers, the bursting strength, tensile strength, tear resistance, folding endurance, opacity, and specific surface of the pulp sheet. Hemicelluloses also serve as a sugar source for yeasts, and can be used for a raw material in the production of furfural and ethyl alcohol. Hemicellulose can also be used to make films, surfactants, fuels, and other chemicals.

An additional important component of lignocellulosic biomass is cellulose. Cellulose is used in a wide variety of applications, including but not limited to nanomaterials, pharmaceuticals, fuels, chemicals, polymers, fibers, paper, and the like. About a third of the world's production of purified cellulose is used as the base material for a number of water-soluble derivatives with pre-designed and wide-ranging properties dependent on the groups involved and the degree of derivatization. For example, cellulose is a source chemical for making cellulose acetate. Hydroxypropylmethylcellulose and methylcellulose may be used in gluten-free bakery products as gluten substitutes. Hydroxypropyl cellulose is a water-soluble thickener, emulsifier and film-former often used in tablet coating. Another important derivative of cellulose is carboxymethylcellulose which may be used as to make additives for foods, pharmaceuticals, and the like.

A minor, but important component of lignocellulosic biomass is extractives that include non-structural phenolic compounds, fatty acids, glycerides, waxes, terpenes, and terpenoids. Such compounds may be useful, for example, for making biopesticides and pharmaceuticals.

Until now, industries have focused on optimizing only one or two components from lignocellulosic biomass without attempting to isolate and purify all of the components listed above. In other words, processes directed to removing and isolating lignin have generally been detrimental to at least one of the three major components of the biomass, rendering such components minimally valuable. Accordingly, what is needed is an integrated process for isolating and purifying all of the components of lignocellulosic biomass to provide purified products in high yield.

In view of the foregoing, an embodiment of the disclosure provides an integrated process for treating lignocellulosic biomass in order to separate the biomass into its component parts. The process includes the steps of: a) contacting the lignocellulosic biomass with a first solvent, for a period of time and at a first temperature at a severity in the range of about 2 to about 4 to remove extractive components and a portion of ash from the biomass. The biomass from step (a) is then contacted with a second solvent, and optional catalyst, at a second temperature at a severity in the range of about 1 to 5 to remove hemicelluloses and additional ash from the biomass. The biomass from step (b) is separated into a lignin product and a cellulose product by contacting the biomass from step (b) with a third solvent at a severity in the range of about 1.5 to 5 to provide a black liquor and a solid fraction containing cellulose.

In another embodiment, there is provided a comprehensive process for treating lignocellulosic biomass in order to separate the biomass into its component parts. The process includes: a) contacting the lignocellulosic biomass with a first solvent for a period of time and at a first temperature at a severity in the range of about 2 to about 4 to remove extractive components and a portion of ash from the biomass. The biomass from step (a) is then separated into a lignin product and a cellulose product by contacting the biomass from step (a) with a third solvent at a severity in the range of about 1.5 to 5 to provide a black liquor and a solid fraction containing cellulose.

A further embodiment of the disclosure provides a comprehensive process for treating lignocellulosic biomass in order to separate the biomass into its component parts. The process includes: a) contacting the lignocellulosic biomass with a first solvent with or without a catalyst at a temperature at a severity in the range of about 1 to 5 to remove hemicelluloses and ash from the biomass. The biomass from step (a) is then separated into a lignin product and a cellulose product by contacting the biomass from step (a) with a third solvent at a severity in the range of about 1.5 to 5 to provide a black liquor and a solid fraction containing cellulose.

An advantage of the claimed process is that individual components of the lignocellulosic biomass may be separated into lignin, cellulose, hemicelluloses, and extractives with high yield and high targeted properties. The high yield and high purity of the components from the lignocellulosic biomass enables the conversion of the components into chemicals, products, and fuels with minimal additional processing. Accordingly, the waste materials from the lignocellulosic biomass components are greatly reduced. For example, the high purity lignin may be converted into carbon fibers without additional extensive lignin treatment and purification steps.

DETAILED DESCRIPTION OF EXEMPLARY EMBODIMENTS

Energy crops such as switchgrass and hybrid poplar are important sources of biomass. Both feedstocks are fast growing and can be processed to the foregoing individual components in relatively high yield and high purity by the processes of the present disclosure.

Until now, lignin and hemicelluloses have been separated from cellulose with subsequent separation of the hemicelluloses from the lignin in a conventional organosolv process. The resulting lignin typically had a purity of between 80 and 90 wt. %. Accordingly, additional processing was required to further purify the lignin. However, the present disclosure provides a process that may provide lignin with a purity of greater than 90 wt. %, such as 94 wt. %, 96 wt. % or 98 wt. % thereby eliminating subsequent purification processes.

According to the disclosure, the biomass, such as obtained from switchgrass or poplar, may be subjected to an extraction step as a first step in a multi-step process to separate the biomass into its component parts. According to the extraction step, the biomass is first heated to about 100° C. in the presence of a first solvent which may include 10 to 100 wt. % water and 90 to 0 wt. % ethanol, and/or other solvents, to remove extractives from the biomass. The extractives include non-structured phenolic compounds and inorganic materials such as calcium, potassium, silica, and heavy metals. The non-structured phenolic compounds may be used for making materials such as pesticides. The process may be described as having a combined severity of about 2-4 wherein the severity ($R_o'$) is provided from the following formula $$R_o' = \log R_o - pH$$

wherein $R_o = (t) \times (\exp^{(Tr-Tb)/14.75})$, wherein t is time in minutes, Tr is a fractionation temperature in ° C. and Tb is a baseline temperature of about 90 to about 110° C.

Next, the extracted biomass is heated to a temperature of about 120° to about 200° C. for up to one hour in the presence of a second solvent selected from water, and/or other solvents, and optionally in the presence of about 0.05 to about 0.5 wt. % acidic catalyst. Accordingly, the process may be described as having a severity of about 1.5 to 5 using the formula above and a baseline temperature of about 90 to about 110° C. The acidic catalyst may be selected from sulfuric acid, phosphoric acid, citric acid, nitric acid, and the like.

The foregoing process may be effective to separate most of the hemicelluloses from the lignin and cellulose thereby providing a biomass stream that may contain 0.1 wt. % or less ash and that has a significant amount of hemicelluloses (between 40 wt. % and 85+ wt. %) removed from the biomass. The ash content of virgin biomass typically ranges from about 0.4 to about 10% or more by weight of the biomass and is typically higher in grasses than in woods. For example, wood without bark typically has less than 1 wt. % ash content while grasses such as switchgrass have between 1 and 10 wt. % ash content. Another advantage of separating the hemicelluloses from the biomass is that the process may provide lignin with a high glass transition temperature ($T_g$) and a lignin purity of about 92 to about 98 wt. %. Yet another advantage of the process is that organic material may be separated from aqueous material more quickly than if the hemicelluloses and extractives remained in the biomass during the organic/aqueous phase separation process.

Subsequent to the extractives and hemicelluloses removal steps, the biomass is subjected to a modified organosolv process as generally described in U.S. Pat. No. 5,730,837. According to the process a third solvent such as a water-insoluble or water-immiscible organic solvent, water, and a water-soluble or miscible alcohol are used. The organic solvent may include a ketone, for example an aliphatic ketone having at least 4 carbon atoms up to about 10 carbon atoms. The alcohol desirably has less than about 4 carbon atoms to assure that it will be water-miscible.

Useful aliphatic ketones include, but are not limited to, for example, methyl ethyl ketone, methyl isopropyl ketone, methyl propyl ketone, methyl butyl ketone, methyl isobutyl ketone, methyl isoamylketone, diethyl ketone, ethyl isopropyl ketone, ethyl propyl ketone, ethyl isobutyl ketone, and mixtures thereof. Useful alcohols include methanol, ethanol, propanol, isopropanol and butanol.

Typically the ketone is present in the third solvent system in an amount of about 7 to 65% by weight, and water is present in an amount of about 10 to 65% by weight. The alcohol is typically present in an amount of about 25 to 35% by weight. The weight ratio of ketone to water is typically in the range of about 1:9 to 6.5:1, so long as a single phase of liquid is obtained. Typically, a weight ratio of third solvent to biomass may range from about 3:1 to about 6:1. An additional ingredient may be 0.025 to about 0.1 molar acidic catalyst.

The biomass is contacted with the foregoing third solvent in a flow through or static process at a temperature ranging from about 120° to about 220° C. for a period of time ranging from about 30 minutes to about 120 minutes to process and thus separate cellulose and lignin from one another. The cellulose component remains as an undissolved solid phase of the fractionation process which is substantially free of re-precipitated lignin because lignin and other dissolved materials predominantly remain in solution at all temperatures of the reaction. The severity for this stage of the process may range from about 1.5 to about 5.

After the above step is completed, there are two options for processing the black liquor. The first option is to separate the black liquor into two liquid phases, an organic phase and an aqueous phase, upon the addition of either water or water-immiscible solvent, and optionally salt. The organic phase contains lignin and is substantially water-immiscible. Upon removal of solvent from the organic phase and ether- and water-washing of the residue, a dry lignin is collected. The aqueous phase also contains lignin and may be evaporated to precipitate the lignin which may be subsequently ether- and water-washed and subsequently filtered to give a dry lignin product. The organic and aqueous lignin products typically have purities ranging from about 90 to about 98 wt. %. Solvent may be removed from the black liquor's organic and aqueous phases by distillation, evaporation, spray drying and the like providing a powdery product containing lignin that may be used in the applications described above.

The second option for processing the black liquor after the fractionation step is completed to remove the solvent directly from the black liquor by distillation, evaporation, spray drying and the like without the addition of either water or water-immiscible solvent, or optionally salt, producing a powdery product containing lignin that may also be used in the applications described above.

In addition to enhancing the purity of lignin from the biomass, the cellulose component may also have enhanced properties such as relatively low Kappa values of 10 to 20, relatively low pentosan values, relatively low ash content due to the extraction stages of the process, easy bleachability, relatively high alpha-value, and the like. Likewise, the lignin component may have a higher glass transition temperature ($T_g$) than lignin made by conventional organosolv processes without the extraction step. The polydispersity index (Mn/Mw) of the lignin product may range from about 3 to about 5. Furthermore, these characteristics are beneficial for downstream processing of the lignin in polymer applications that involve thermal processing.

The processes of the disclosed embodiments may be useful for fractionating all types of lignocellulosic material into separate components. For example, the processes may utilize hardwood, softwood, and herbaceous materials such as sugar-cane bagasse, switchgrass, native grasses, and agricultural residues.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Switchgrass or hybrid poplar were subjected to fractionation by treatment with a mixture of methyl isobutyl ketone (MIBK), ethanol and water (16/34/50 wt. %) and a sulfuric acidic catalyst (organosolv process), using a process as generally described in U.S. Pat. No. 5,730,837 to provide lignin, hemicelluloses, and cellulose. The lignin was separated from the hemicelluloses product and dried. The isolated lignin may be used directly, or subjected to an optional upgrading process, and then formed into fibers. The initially produced fibers may be subjected to a thermal treatment to set and strengthen the fibers, affording a final product.

The following examples provide details of the separation processes and foam and fiber products made from lignin according to the disclosure.

Example 1

Solvent Fractionation of Switchgrass Under Flow-through Conditions

Chopped switchgrass (931 grams) was subjected to solvent fractionation with a mixture of methyl isobutyl ketone (MIBK), ethanol and water (16/34/50 by weight) and 0.05 molar $H_2SO_4$ at a severity of 2.5. The reactor was filled with the solvent mixture and heated to 160° C., and then additional solvent mixture was pumped through the reactor for 120 minutes to collect a total of 10.6 liters of black liquor. The black liquor was mixed with solid NaCl (15% of the weight of water contained in the black liquor) to afford initial organic and aqueous layers. The aqueous layer was drained and the organic layer was washed with ~1300 ml of water. The layers were again separated and the organic layer was washed again with ~700 ml of water. The combined volume of the all aqueous fractions was 11.3 liters and the total volume of the organic fraction was 1.5 liters. Solvent was removed from the organic fraction on the rotary evaporator. The residue was washed five times with diethyl ether, with the ether being decanted each time. The resulting solid was placed under vacuum to give a free flowing powder. The powder was slurried in water overnight, filtered and dried under vacuum overnight at 80° C. The organic lignin had a purity of 92.9 wt. %, and the aqueous lignin had a purity of 90 wt. %. In total, 70.3 wt. % of the lignin was isolated from the biomass.

Example 2

Hemicelluloses Extraction Followed by Fractionation of Switchgrass Under Flowthrough Conditions Chopped switchgrass (934 grams) was placed in the reactor. Water was pumped into the reactor and the biomass was heated to 160° C. for 60 minutes to give a severity of 3.54. The water was drained to give 4.3 liters of a hemicellulose-rich hydrolysate with a sugar concentration of 34 g/L. Solvent fractionation was carried out on the extracted biomass using a mixture of MIBK, ethanol and water (16/34/50 by weight) and 0.05 molar $H_2SO_4$ at a severity of 2.5. The reactor was filled with the solvent mixture and heated to 160° C., and then additional solvent mixture was pumped through the reactor for 120 minutes to collect a total of 15 liters of black liquor. The black liquor was mixed with NaCl (15% of the weight of water contained in the black liquor) to afford initial organic and aqueous layers. The aqueous layer was drained and the organic layer was washed with ~1200 ml of water. The layers were again separated and the organic layer was washed again with ~700 ml of water. The combined volume of the all aqueous fractions was 16 liters and the total volume of the organic fraction was 1.5 liters. Solvent was removed from the organic fraction on the rotary evaporator. The residue was washed five times with diethyl ether, with the ether being decanted each time. The resulting solid was placed under vacuum to give a free flowing powder. The powder was slurried in water overnight, filtered and dried under vacuum overnight at 80° C. The organic lignin had a purity of 96.2 wt. % and an ash content of 0.19 wt. %. The aqueous lignin had a purity of 95.8 wt. % and 0.33 wt. % ash. In total, 71.4 wt. % of the lignin was isolated. The ash content was 1.7 wt. % for the cellulose fraction.

Example 3

Hemicelluloses Extraction Followed by Solvent Fractionation of Switchgrass Under Static Conditions Chopped switchgrass (887 grams) was placed in the reactor. Water was pumped into the reactor and the biomass was heated to 160° C. for 60 minutes to give a severity of 3.54. The water was drained to give 5 liters of a hemicellulose-rich hydrolysate with a sugar concentration of 22 g/L. Solvent fractionation was carried out on the extracted biomass using a mixture of MIBK, ethanol and water (16/34/50 by weight) and 0.05 molar $H_2SO_4$ at a severity of 2.5. The reactor was filled with solvent and heated to 160° C., and held at that temperature for 15 minutes to give a severity of 1.6. The reactor was drained to give 7.8 liters of black liquor. A portion of the black liquor was separated into three fractions. Each fraction was worked up differently.

Fraction A: All solvent was removed from the black liquor on a rotary evaporator to give lignin with a purity of 72.8 wt. % and an ash content of 1.7 wt. %.

Fraction B: All solvent was removed from the black liquor on the rotary evaporator, and the residue was washed two times with diethyl ether, with the ether being decanted each time. The resulting solid was placed under vacuum to give a free flowing powder with a purity of 82.9 wt. % and an ash content of 0.7 wt. %.

Fraction C: All solvent was removed from the black liquor on the rotary evaporator, and the residue was washed two times with diethyl ether, with the ether being decanted each time. The resulting solid was placed under vacuum to give a free flowing powder. The powder was slurried in water overnight, filtered and dried under vacuum overnight to give a lignin with a purity 89.6 wt. %. The cellulose fraction contained between 18.4 wt. % to 22.5 wt. % of lignin.

Example 4

Organosolv Lignin Based Carbon Foams

Figure 1A:
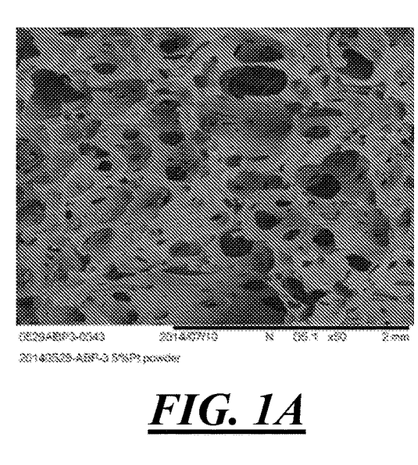
FIG. 1 are photomicrographs of carbon foams made from lignin according to an embodiment of the disclosure.
Figure 1B:
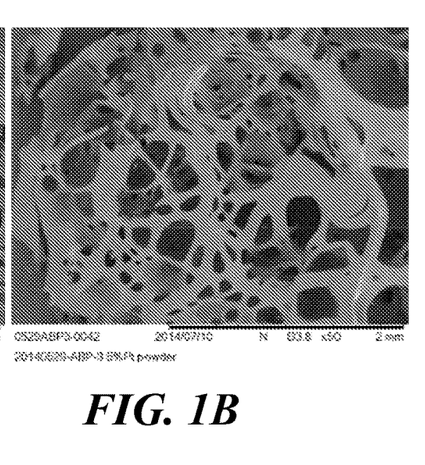

Isolated organosolv switchgrass and poplar have been used to produce carbon foams. The foams were produced from organosolv lignin with an MIBK/ethanol/water blend at 160° C. for 120 minutes with a 0.05 molar sulfuric acid catalyst. The hardwood and switchgrass lignins both possessed a Tg of approximately 121° C.+/−1° C. and a volatile content of 5 wt. % at 250° C. by thermogravimetric analysis (TGA). Again, both lignins possessed similar yields of 37 wt. % solids at 900° C. as measured by TGA, which reflected the starting material yield after carbonization. The foams were placed in a sealed pressure reactor under pure nitrogen gas at 135 psi. An adjustable check valve was used to maintain constant pressure. The temperature was increased at a rate of approximately 1.5° C./min to 250° C. The volatile materials in the lignin were used as the blowing agent. After pressure treatment, the foams were already stabilized and were directly carbonized. Foams were carbonized in a tube furnace by heating in pure nitrogen gas to 600° C. at a rate of 3° C./min, holding at 600° C. for 5 min, heating to 1000° C. at a rate of 5° C./min, and holding at 1000° C. for 15 min. Carbon foams possessed a continuous open cell network structure with a density of 0.26 g/cm$^3$. Photomicrographs of the carbon foams produced by the foregoing process are shown in FIGS. 1A and 1B, wherein FIG. 1A was a carbon foam made from switchgrass and FIG. 1B was a carbon foam made from hardwood.

Example 5

Optional Upgrading of Isolated Lignin

Switchgrass lignin (60.4 grams) isolated from solvent fractionation was extracted with methanol until further treatment gave liquors containing less than 0.25 g/L of recoverable solids. Each methanol extract was vacuum filtered and the filtrates combined. The filtrates were evaporated and the resulting lignin fraction was dried at 80° C. for 24 hours under vacuum to give 25.1 grams of an initial upgraded lignin fraction. The undissolved solids recovered after filtration were then extracted using a 70/30 (by volume) mixture of methanol and methylene chloride until further treatment gave liquors containing less than 0.25 g/L of recoverable solids. Each 70/30 extract was filtered through a funnel at the pump and the filtrates combined. The filtrates were evaporated and the resulting lignin fraction was dried at 80° C. for 24 hours under vacuum to give 24.8 grams of a second upgraded lignin fraction. A final undissolved residue (5.04 grams) was also isolated. The measured properties of the extracts are shown in Table 1.

TABLE 1

|  | MeOH Extract | 70/30 Extract | Residue |
| --- | --- | --- | --- |
| Yield (wt. %) | 41.5 | 41.0 | 8.34 |
| $T_g$ (° C.) | 107.5 | ~161 | ~209 |
| $\Delta C_p$ (J/g ° C.) | 0.388 | ND | ND |
| $T_m$ (° C.) | 132 | 195 | — |
| $T_f$ (° C.) | 135 | 205 | — |
| Char (wt. %) | 29.7 | 36.3 | 33.0 |
| Ash content (wt. %) | 0.05 | 0.05 | N.A. |

Example 6

Melt Spun Carbon Fibers from Switchgrass and Hardwood Lignins

Melt spinning of poplar, switchgrass, and extracted switchgrass lignin was performed with a Haake MiniLab conical twin screw extruder (Thermo Electron Corp) setup for counter-rotating operation. Lignin for carbon fiber was produced using organosolv reactor conditions of 160° C. with 0.05 molar acid catalyst for 120 min. Melt spinning of the switchgrass lignin was carried out on a methanol extract fraction of lignin described in Example 5. A rotating cylinder having a diameter of 76.2 mm and a length, 101.6 mm was used as a collector. Custom designed spinnerets with external temperature control of 120 and 150 μm were used to produce fiber in the range of 10-40 μm after drawing down. The extruder and spinneret were maintained at 190° C. and 200° C. respectively for switchgrass. Poplar lignin fibers were spun using extruder and spinneret temperatures of 185° C. and 190° C. respectively. Poplar lignin fibers were also spun on a custom multifilament single screw extrusion line (Alex James and Associates). The fibers are extruded vertically through a spinneret equipped with 12×120 μm openings. The fibers are collected after being drawn down over 2 meters onto a drum operated by a Leesona winder operating at a rate of 200-250 m/min.

The raw lignin fibers underwent oxidative thermostabilization to prevent fusing during carbonization. The stabilization was performed by heating the fiber sample to 250° C. at a rate of 0.02-0.1° C./min and held for 30 min at 250° C. under a constant flow of air using a forced air programmable convection furnace. Upon stabilization, fibers were carbonized in a tube furnace by heating in pure nitrogen gas to 600° C. at a rate of 3° C./min, holding at 600° C. for 5 min, heating to 1000° C. at a rate of 5° C./min, and holding at 1000° C. for 15 min.

Figure 2:
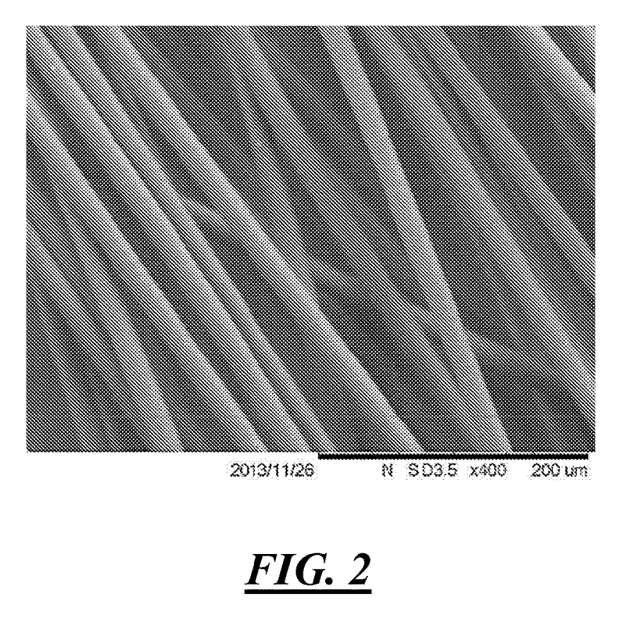
FIG. 2 is a photomicrograph of carbon fibers made from poplar lignin by a process according to an embodiment of the disclosure.
Figure 3:
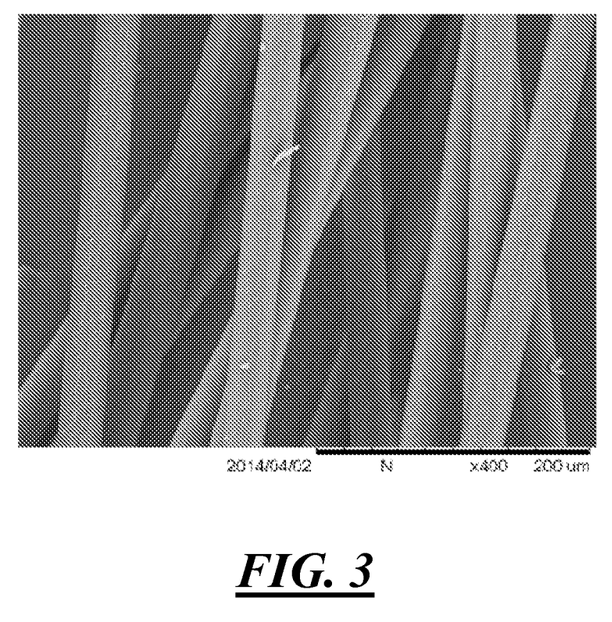
FIG. 3 is a photomicrograph of carbon fibers made from switchgrass lignin by a process according to an embodiment of the disclosure.
Figure 4:
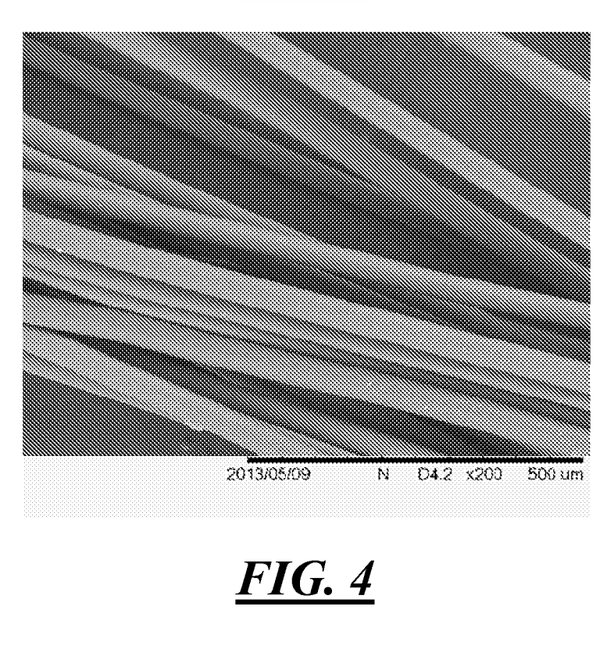
FIG. 4 is a photomicrograph of carbon fibers made from extracted switchgrass lignin by a process according to an embodiment of the disclosure.

The morphology of finished fibers was examined by scanning electron microscopy. A photomicrograph of carbon fibers made from poplar lignin by the foregoing process is shown in FIG. 2. A photomicrograph of carbon fibers made from switchgrass lignin by the foregoing process is shown in FIG. 3. A photomicrograph of carbon fibers made from extracted switchgrass lignin by the foregoing process is shown in FIG. 4.

Tensile properties were assessed according to ASTM Standard Method D3379-75 using an Instron 5943 load frame equipped with a 10N load cell.

TABLE 2

Properties of lignin based carbon fibers

|  | Switchgrass | Extracted switchgrass | Poplar |
|---|---|---|---|
| Diameter | 15.1 | 31.7 | 16.6 |
| Tensile strength (MPa) | 476 | 378 | 524 |
| Tensile modulus (GPa) | 34.1 | 37.2 | 39.2 |

Example 7

Electrospun Lignin Nanofibers

Figure 5:
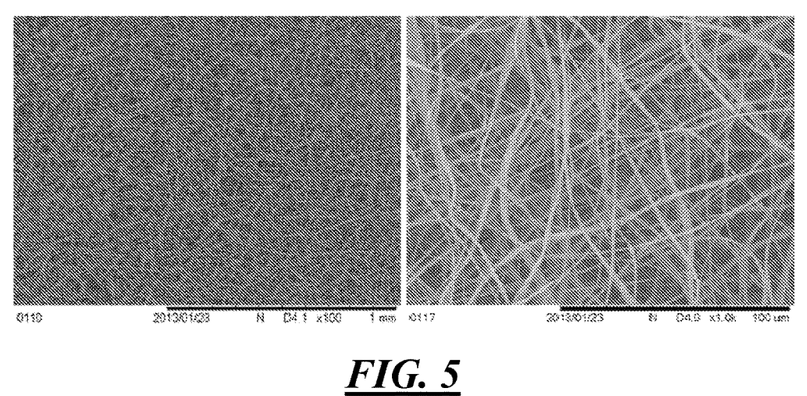
FIG. 5 are photomicrographs of electrospun carbon fibers from extracted organosolv switchgrass.
Figure 6:
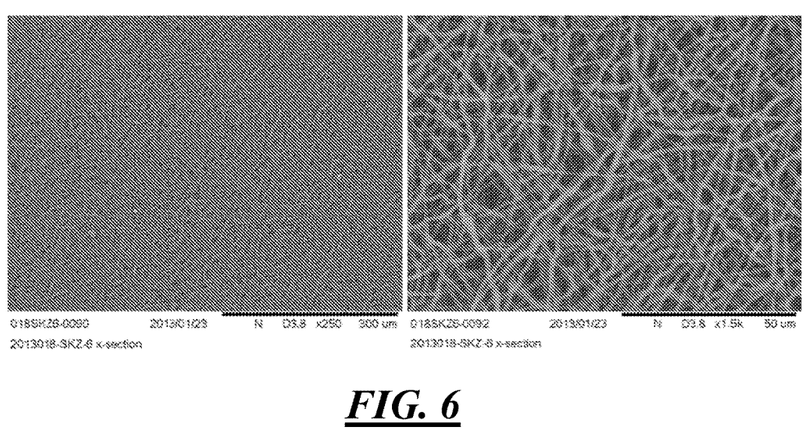
FIG. 6 are photomicrographs of electrospun carbon fibers from organosolv poplar.

Poplar lignin isolated under solvent fractionation conditions (16/34/50 MIBK/ethanol/water, 140° C., 0.05 molar $H_2SO_4$) and switchgrass lignin isolated under solvent fractionation conditions (16/34/50 MIBK/ethanol/water, 140° C., 0.05 molar $H_2SO_4$) followed by extraction with a 70/30 (v/v) mixture of methanol/methylene chloride were electrospun into fibers. Lignin was dissolved in a mixture of 75/25 (w/w) dimethylformamide/methanol at concentrations of 45 and 55 (wt. %) for switchgrass and poplar, respectively. A rotating grounded aluminum cylinder was used as collector. A potential difference of 15 KV was applied between the tip of needle mounted to the plastic syringe and collector. Electrospun fibers from either switchgrass or poplar lignin were stabilized by heating to 250° C. at a rate of 0.1° C./min and holding for 30 minutes at 250° C. The stabilized fibers were carbonized by heating to 950° C. at a rate of 10° C./min and holding for 2 minutes at 950° C. The final fibers from poplar sample was brittle while switchgrass fibers were flexible. Photomicrographs of electrospun carbon fibers from organosolv switchgrass and poplar lignin are shown in FIGS. 5 and 6, respectively.

It will be appreciated that lignin made by the disclosed process may be more suitable for making carbon fibers than lignin by a conventional process due to the enhanced properties of the lignin as set forth herein.

Example 8

Solvent Fractionation to Isolate Cellulose Under Flow-through Conditions

Chopped switchgrass (430 grams) was subjected to solvent fractionation with a mixture of methyl isobutyl ketone (MIBK), ethanol and water (16/34/50 by weight) and 0.05 molar $H_2SO_4$. The reactor was filled with the solvent mixture and heated to 160° C., and then additional solvent mixture was pumped through the reactor for 120 minutes. The reactor was drained of black liquor and the insoluble cellulose fraction was mixed with 10-15 liters of water. The cellulose slurry was fiberized in a laboratory blender in small batches until the particle size was homogeneous and the slurry was smooth. The collected fiberized material was placed in a large Buchner funnel and washed with water for two hours. After draining the washwater, the cellulose cake was pressed under vacuum for 30 minutes using a latex dam to remove additional water. Multiple identical runs were carried out and all cellulose was combined (Sample 1) to afford an average of 561 grams per run of cellulose cake with a moisture content of 81.3 wt. %, or an average dry equivalent cellulose yield per run of 105 grams. Five additional runs were carried out at a larger scale (average switchgrass charge of 1000 grams) but otherwise identical conditions (Sample 2) to give an average of 1442 grams of cellulose cake per run with a moisture content of 83.4 wt. %, or an average dry equivalent cellulose yield per run of 239 grams. A further run was carried out with 430 grams of chopped switchgrass at 140° C. and 0.05 molar $H_2SO_4$ and pumping of solvent through the reactor for 60 minutes (Sample 3). Identical workup gave a cellulose cake of 930 grams with a moisture content of 84.7 wt. %, or a dry equivalent weight of 143 grams. Table 3 shows the measured viscosity for the cellulose samples.

TABLE 3

Intrinsic Viscosity

| Sample | η | η/η₀ | C, g/ml | [η] ml/g |
|---|---|---|---|---|
| Sample 1 | 3.282 | 2.620 | 0.0106 | 108 |
| Duplicate | 3.205 | 2.559 | 0.0103 | 110 |
| Average |  |  |  | 109 |
| Sample 2 | 4.086 | 3.261 | 0.0119 | 123 |
| Duplicate | 3.937 | 3.142 | 0.0107 | 131 |
| Average |  |  |  | 127 |
| Sample 3 | 3.981 | 3.178 | 0.0021 | 667 |
| Duplicate | 3.244 | 2.590 | 0.0017 | 650 |
| Average |  |  |  | 659 |
| Sample 1 - repeat | 3.207 | 2.560 | 0.0100 | 111 |
| Duplicate | 3.224 | 2.574 | 0.0101 | 111 |
| Average |  |  |  | 111 |
| η₀ | 1.253 |  |  |  |

Note:
Intrinsic viscosity measured following standard procedure ISO 5351

Table 4 shows the kappa values for the cellulose samples.

TABLE 4

10 minute Kappa

| Sample | Kappa # |  |
|---|---|---|
| Sample 1 | 10.85 |  |
| Duplicate | 10.81 |  |
| Average |  | 10.83 |
| Sample 2 | 21.62 |  |
| Duplicate | 22.38 |  |
| Average |  | 22.00 |
| Sample 3 | 27.42 |  |
| Duplicate | 27.26 |  |
| Average |  | 27.34 |
| Sample 1 - repeat | 10.35 |  |
| Duplicate | 10.27 |  |
| Average |  | 10.31 |

Note:
Kappa number measured following Tappi standard T236

Table 5 shows the pentosan levels for the cellulose samples.

TABLE 5

Pentosans

| Sample | Pulp, g | Absorbance | Pentosans, % |
|---|---|---|---|
| Sample 1 | 0.602 | 0.023 | 0.34 |
| Sample 2 | 0.599 | 0.030 | 0.58 |
| Sample 3 | 0.572 | 0.220 | 7.27 |
| Duplicate | 0.601 | 0.229 | 7.22 |

TABLE 5-continued

| | | Pentosans | |
|---|---|---|---|
| Sample | Pulp, g | Absorbance | Pentosans, % |
| Average | | | 7.25 |
| Sample 1 - repeat | 0.616 | 0.026 | 0.43 |

Note:
Pentosans determined following Tappi standard T223 cm-01

The analytical results suggest that cellulose isolated using the process described herein will be useful for multiple applications.

With reference to the above tables, the intrinsic viscosity (a rough measure of molecular weight) is typical for celluloses used in commercial applications.

The kappa values (a measure of residual lignin in the cellulose) show that this process removes significantly more lignin from the cellulose than other cellulose production processes (e. g., the kraft process). The low kappa numbers (10-20), suggest that most lignin is being removed during fractionation. A low lignin cellulose will require less bleaching to generate a purified cellulose. Bleaching may therefore be possible using more environmentally friendly systems (peroxide, oxygen) avoiding the use of chlorine-based bleaches. For example, preparation of cellulose for cellulose ester production could require fewer bleaching steps which translates into lower operational cost.

The pentosan level (a potential source of impurities during conversion of cellulose to commercial products) is significantly lower than other cellulose production processes. This is a valuable observation as a low pentosan content suggests that less processing would be necessary to convert cellulose into a commercial product. For example, conversion of this cellulose into cellulose esters would require fewer extraction steps than conventional processing, which translates into lower operational cost.

Using a hemicelluloses extraction procedure within the overall process, provides access to a mixture of hemicellulose sugars which are known to be useful for fermentation or chemical conversion to fuels and high value products. Hemicellulose extraction is just one component of the larger process, which takes a bioenergy crop and provides access to all of its individual components. Furthermore, removing some of the hemicelluloses first, in an extraction step provides access to a purer sugar stream, and may make direct spray drying or distillation of the black liquor cleaner on the back end. Accordingly, the extraction step may reduce the amount of solvent that is used, and also may eliminate the NaCl separation step. Finally, the extraction step, within the overall process may also reduce the need to use the high severity conditions in the subsequent solvent step. So there are several distinct aspects of the disclosed process that result from the hemicelluloses extraction step such as, a) provision of a fermentable sugar stream for use in the creation of fuels and chemicals; b) easier distillation of the black liquor, c) reduced solvent utilization, d) elimination and/or reduction of a salt separation step, or other means of phase separation, and e) reduction of the required severity conditions at which the reaction is run.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A comprehensive process for treating lignocellulosic biomass in order to separate the biomass into its component parts, the process comprising:
   a) contacting the lignocellulosic biomass with a first solvent for a period of time and at a first temperature at a severity in the range of about 2 to about 4 to remove extractive components and a portion of ash from the biomass; and
   b) separating the biomass after step (a) into a lignin product and a cellulose product by contacting the biomass after step (a) with a second solvent at a severity in the range of about 1.5 to 5 to provide a black liquor and a solid fraction containing cellulose,
   the severity ($R_o'$) in steps (a) and (b) being determined by the formula $R_o'=\log R_o-pH$ wherein $R_o=(t)\times(\exp^{(Tr-Tb)/14.75})$, wherein t is time in minutes, Tr is a fractionation temperature in ° C. and Tb is a baseline temperature from about 90 to about 110° C.

2. The process of claim 1 further comprising, prior to step (b), contacting the biomass from step (a) with a third solvent, with or without a catalyst, at a second temperature at a severity in the range of about 1 to 5 to remove hemicelluloses and additional ash from the biomass,
   wherein the severity ($R_o'$) being determined by the formula $R_o'=\log R_o-pH$ wherein $R_o=(t)\times(\exp^{(Tr-Tb)/14.75})$, wherein t is time in minutes, Tr is a fractionation temperature in ° C. and Tb is a baseline temperature from about 90 to about 110° C.

3. The process of claim 1 wherein the black liquor is processed by adding salt or water, or water immiscible solvent to induce a phase separation resulting in an organic phase and an aqueous phase, wherein the organic and aqueous phases each contain a significant amount of lignin, extracting the lignin by removing the solvent in each phase using a spray drier, rotary evaporator, or other distillation method.

4. The process of claim 1, wherein the lignin product has a purity of about 90 wt. % or greater.

5. The process of claim 1 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

6. The process of claim 1 wherein the black liquor is processed by spray-drying or the solvent is removed from the solution on a rotary evaporator or similar distillation process.

7. The process of claim 6 wherein the resulting lignin is washed with ether to remove residual solvent or other contaminants and additional solvent removal is applied to isolate the purified lignin product.

8. The process of claim 7 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

9. The process of claim 6 wherein the resulting lignin is washed with water to remove residual, sugars, ethanol, or other contaminants and additional solvent removal is applied to isolate the purified lignin product.

10. The process of claim 9 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

11. The process of claim 6 wherein the resulting lignin is washed with water to remove residual, sugars, ethanol, or other contaminants; the resulting lignin is washed with ether to remove residual solvent, sugars, or other contaminants; and additional solvent removal is applied to isolate the purified lignin product.

12. The process of claim 11 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

13. The process of claim 1 wherein the lignin product has a number average molecular weight of from about 1000 to about 5000 and a polydispersity index ranging from about 3 to about 5.

14. The process of claim 1 wherein the first solvent and second solvent comprise a solvent selected from the group consisting of water, ethanol, ketone, and a combination of two or more of the foregoing.

15. The process of claim 1 wherein the second solvent comprises a mixture of water, ethanol and ketone in a weight ratio ranging from about 1:1:2 to about 1:2:4.

16. The process of claim 1 wherein the lignocellulosic biomass comprises switchgrass or poplar.

17. The process of claim 1 wherein the lignin product has a polydispersity index ranging from about 3 to about 5.

18. The process of claim 1 further comprising producing a foam from the lignin product.

19. The process of claim 1 further comprising producing an electrospun fiber from the lignin product.

20. The process of claim 1 further comprising producing carbon fibers from the lignin product.

21. A comprehensive process for treating lignocellulosic biomass in order to separate the biomass into its component parts, the process comprising:
   a) contacting the lignocellulosic biomass with a first solvent with or without a catalyst at a temperature at a severity in the range of about 1 to 5 to remove hemicelluloses and ash from the biomass; and
   b) separating the biomass after step (a) into a lignin product and a cellulose product by contacting the biomass after step (a) with a second solvent at a severity in the range of about 1.5 to 5 to provide a black liquor and a solid fraction containing cellulose, the severity ($R_o'$) in steps (a) and (b) being determined by the formula $R_o'=\log R_o-pH$ wherein $R_o=(t) \times (\exp^{(Tr-Tb)/14.75})$, wherein t is time in minutes, Tr is a fractionation temperature in ° C. and Tb is a baseline temperature from about 90 to about 110° C.

22. The process of claim 21 wherein the black liquor is processed by adding salt or water, or water immiscible solvent to induce a phase separation resulting in an organic phase and an aqueous phase, wherein the organic and aqueous phases each contain a significant amount of lignin, extracting the lignin by removing the solvent in each phase using a spray drier, rotary evaporator, or other distillation method.

23. The process of claim 21, wherein the lignin product has a purity of about 90 wt. % or greater.

24. The process of claim 21 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

25. The process of claim 21 wherein the black liquor is processed by spray-drying or the solvent is removed from the solution on a rotary evaporator or similar distillation process.

26. The process of claim 21 wherein the resulting lignin is washed with ether to remove residual solvent or other contaminants and additional solvent removal is applied to isolate the purified lignin product.

27. The process of claim 26 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

28. The process of claim 21 wherein the resulting lignin is washed with water to remove residual, sugars, ethanol, or other contaminants and additional solvent removal is applied to isolate the purified lignin product.

29. The process of claim 28 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

30. The process of claim 21 wherein the resulting lignin is washed with water to remove residual, sugars, ethanol, or other contaminants; the resulting lignin is washed with ether to remove residual solvent, sugars, or other contaminants; and additional solvent removal is applied to isolate the purified lignin product.

31. The process of claim 30 wherein the lignin product is further processed by washing the material with methanol to obtain two sub-fractions of lignin characterized by a lower molecular weight lignin fraction and a higher molecular weight lignin fraction, wherein a methanol rinsate contains the lower molecular weight lignin and the higher molecular weight lignin remains as a solid, and wherein the methanol rinsate containing the lower molecular weight lignin is distilled on a rotary evaporator or spray-dried to provide a yield of lower molecular weight lignin yield ranging from about 40 wt. % to about 60 wt. %.

32. The process of claim 21 wherein the lignin product has a number average molecular weight of from about 1000 to about 5000 and a polydispersity index ranging from about 3 to about 5.

33. The process of claim 21 wherein the first solvent and second solvent comprise a solvent selected from the group consisting of water, ethanol, ketone, and a combination of two or more of the foregoing.

34. The process of claim 21 wherein the second solvent comprises a mixture of water, ethanol and ketone in a weight ratio ranging from about 1:1:2 to about 1:2:4.

35. The process of claim 21 wherein the lignocellulosic biomass comprises switchgrass or poplar.

36. The process of claim 21 wherein the lignin product has a polydispersity index ranging from about 3 to about 5.

37. The process of claim 21 further comprising producing a foam from the lignin product.

38. The process of claim 21 further comprising producing an electrospun fiber from the lignin product.

39. The process of claim 21 further comprising producing carbon fibers from the lignin product.

* * * * *